United States Patent
Bottcher et al.

[11] 3,997,828
[45] Dec. 14, 1976

[54] COPY-REPEATER ARRANGEMENT AND METHOD OF ADJUSTING THE SAME

[75] Inventors: Jurgen Bottcher, Kaltenkirchen; Uwe Selmer, Meldorf, both of Germany

[73] Assignee: Dr. -Ing. Rudolf Hell GmbH, Postfach, Germany

[22] Filed: Dec. 9, 1974

[21] Appl. No.: 531,083

[30] Foreign Application Priority Data

Dec. 13, 1973 Germany .......................... 2361903

[52] U.S. Cl. .............................. 318/603; 318/625; 318/85; 318/314
[51] Int. Cl.² ........................................ G05B 19/28
[58] Field of Search ............. 318/85, 625, 364, 603

[56] References Cited

UNITED STATES PATENTS

| | | | |
|---|---|---|---|
| 3,408,547 | 10/1968 | Saeger ................................. | 318/85 |
| 3,462,665 | 9/1969 | Espey et al. ........................ | 318/85 |
| 3,582,541 | 6/1971 | Hebb .............................. | 318/314 X |
| 3,582,550 | 6/1971 | Latanzi ........................... | 318/314 X |
| 3,614,576 | 10/1971 | Raphael ............................ | 318/625 |
| 3,718,846 | 2/1973 | Bejach ................................. | 318/85 |
| 3,906,327 | 9/1975 | O'Callaghan et al. ............. | 318/625 |
| 3,911,488 | 10/1975 | Wood et al. .................... | 318/314 X |

FOREIGN PATENTS OR APPLICATIONS 2,163,474 6/1973 Germany

Primary Examiner—Robert K. Schaefer
Assistant Examiner—John J. Feldhaus
Attorney, Agent, or Firm—Ernest F. Marmorek

[57] ABSTRACT

A pair of cylinders is rotated in synchronism; each cylinder has a mark on its periphery and the marks are to be moved to angular coincidence. A train of counting pulses is derived from a train of timing pulses which controls the drive of one of the cylinders; when a signal is generated as the mark of this cylinder passes a fixed point, this counting pulse train is applied to a forward-reverse counter to make it count backwards from a reference value. As soon as the signal indicative of the passage of the mark on the other cylinder is generated, the counting pulse train is cut off and a pulse train derived from it but of stepped-down pulse frequency, is applied to the counter to make the same count forward to the reference value. During the forward counting, and until the reference value is reached again, the train of counting pulses is modified by adding or suppressing timing pulses, until the next signals from the one and the other cylinder indicate angular coincidence of the marks.

9 Claims, 12 Drawing Figures

COPY-REPEATER ARRANGEMENT AND METHOD OF ADJUSTING THE SAME

BACKGROUND OF THE INVENTION

This invention relates to a copy-repeater arrangement and to a method of adjusting the same.

The present invention is applicable with respect to any structure wherein a pair of elements are to be rotated synchronously but must be first angularly adjusted relative to one another, to assume a predetermined relative angular position. Since the invention is especially useful in copy-repeating apparatus, such as scanners, facsimile apparatus and clichegraphs, it will be described with reference thereto in the description which follows.

In photogravure printing it is necessary to prepare rotary printing forms which are then used to print onto paper or the like. To do this, the original to be printed is usually electro-optically scanned and the signals thereby derived are used to actuate an engraving device which engraves onto a rotating printing form, such as a printing cylinder, a series of depressions or "cups" which are distributed in accordance with a screen point system or "raster". The scanning is carried out by rotating a scanning drum in synchronism with the printing form; the scanning drum carries the original which is scanned by a scanning head that is capable of moving in parallel with the drum axis. The tone values of the original which are scanned in accordance with the screen used on the recording side are converted into analog electrical signals which are used to control the movement of the aforementioned engraving device that is movable parallel to the axis of the printing form and has a tool that forms depressions therein. The depth of these depressions varies in dependence upon the tone value indicated by a particular signal. It will be understood that the signals indicative of the tone values scanned have a constant-frequency screen signal superimposed upon them in order to obtain the desired screen point distribution.

When the printing form is finished it can be used to print the desired image onto paper or the like. For this purpose it is inked so that the ink becomes retained in the depressions formed as outlined above. Since the depressions are of varying depth, it follows that they will accept varying quantites of ink and this, in turn, will result in printing of ink dots of varying color density, thus reproducing the tone value of the corresponding point on the previously scanned original.

The scanning drum and the printing form, hereafter called the scanning cylinder and the printing cylinder, of prior art machines of this type are each driven in rotation by a separate synchronous motor which is supplied either with net current or from a rectifier.

It is absolutely essential that both of these cylinders rotate in absolute synchronism, as otherwise there will be inaccuracies in the recorded (engraved) image. This is of even greater importance if color printing is to be carried out, because in that case a separate printing cylinder must be produced from the original for each color to be printed. Each printing cylinder of such a set then prints the image in a different color, and each image is printed over the preceding different-colored image, until the combined images afford the desired color effect. It is readily understandable that if there are any inaccuracies in the engraved images on one or more of the printing cylinders, the several colors of the different images will not precisely overlap, with the result that the finished color print is of very noticeably poor quality.

The aforementioned inaccuracies need not solely be the result of difficulties in the engraving of the image on the printing form; they can also result from improper synchronism in the rotation of the several printing cylinders during the actual printing operation. However, whereas this latter problem can be corrected by appropriate adjustments to the printing machine, inaccuracies which have resulted from improper locating of the engraved image on a printing cylinder, cannot be so corrected. Because of this, the printing cylinders must be engraved with great precision, i.e. the proper location of the engraved image or portions thereof on the cylinder must be assured to within e.g. about 1/100 mm.

These problems are aggravated by other requirements in some instances. For example, it is frequently required that on all printing cylinders of a cooperating set the engraved image should begin at a certain point or mark on the cylinder, such as a groove, which is present on all cylinders of the set at identical locations relative to the cylinder circumference. This requirement is made because it aids in later adjustments of the printing machine, and it evidently presents additional difficulties with respect to the proper positioning of the engraved image.

Also, it is often necessary that the engraving of a printing cylinder be carried out in two or more stages. For example, when the printing cylinder is to be used for printing one or more pages of a magazine where the page make-up may consist of text and/or pictures and advertisements, such as multi-stage engraving operation may have to be carried out. The advertiser is usually furnished so-called "proofs" of his advertisement, i.e. actual printing runs which show the quality of the advertisement reproduction, so that he may approve or disapprove of the quality. This means that the printing cylinder must be engraved with the advertisement in order to make it possible to print such proofs. The text and/or accompanying pictures which go on the same page as the advertisement may, however, be readied only very much later, just shortly before the magazine goes to press. The engraving of this material must therefore be carried out in a second engraving stage, and the material must be engraved with great precision in precisely the portions of the printing cylinder surface which have been reserved for this purpose. Moreover, this precision is required not only for a single printing cylinder when a set of color-printing cylinders is concerned, but for all cylinders of the set, and there must not be any deviation in the location of the added material from cylinder to cylinder of the set.

The known engraving equipment of the type under discussion does not provide for any association between the rotation of the cylinders and the initiation of the engraving operation; after the equipment has been started, the scanning cylinder and the printing cylinder rotate in synchronism but are angularly (i.e. circumferentially) offset with reference to one another. There is, therefore, no way in which the problems outlined above can be solved with such equipment unless auxiliary means are used which make it possible to turn one of the two cylinders involved in the engraving operation (i.e. the scanning cylinder and the recording cylinder) with reference to the other, to thereby permit the engraving to begin at a predetermined point on the printing cylinder circumference or, alternately, to restore the relative positions of the original for the first gravure on the scanning cylinder and the first gravure on the printing cylinder which existed at the time the first gravure was made.

The art does, indeed, teach a device which can be used for such a purpose. Each of the two cylinders is associated with a stationary signal generator which scans the cylinder and, when it detects a mark thereon, furnishes a signal indicate of the circumferential (angular) position of the associated cylinder. The signals derived from the signal generators of both cylinders are fed to and made visible on, the screen of a storage oscilloscope.

The reluctance motor driving one of the cylinders is connected directly to net voltage, whereas an induction voltage regulator is connected between the net and the reluctance motor driving the other cylinder. An induction voltage regulator is a net-voltage operated induction machine having a rotor which can be only manually turned relative to the associated stator, making it possible to phase-shift the voltage induced in the rotor with reference to the net voltage. Therefore, turning of the rotor in the prior-art arrangement makes it possible to obtain a turning of one motor (and its associated cylinder) with reference to the other motor and the cylinder driven by the same. To do so, an operator turns the rotor of the regulator while watching the oscilloscope screen; when the two visually reproduced signals coincide on the screen, the cylinders have the desired relative angular orientation.

However, while this suggestion constitutes a definite advantage over the approaches tried prior to it, there are certain disadvantages involved.

One of these resides in the fact that the coincidence setting must under all circumstances be carried out manually. This requires not merely the presence of an operator, but the presence of a skilled and experienced operator. Even then, the accuracy of the coincidence obtained may vary widely from case to case, depending upon skill of the operator, his attention or lack of it, possible distractions, and similar factors.

Another disadvantage is that the entire apparent power for the motor is supplied via the voltage regulator. Since reluctance motors have high idle power and the dissipation losses of an induction voltage regulator are substantial, the voltage regulator must be constructed for a high throughput capacity, which makes it expensive.

Finally, the use of a storage oscilloscope and a rotary transformer make this prior art arrangement very expensive.

SUMMARY OF THE INVENTION

Accordingly, a general object of the present invention is to overcome the prior-art disadvantages as outlined above, and to meet the aforementioned requirements.

More particularly, it is an object of this invention to provide a novel method of effecting the relative angular (circumferential) displacement of two rotating components, such as drums or cylinders, which avoids the aforementioned problems.

An additional object of the invention is to provide such a method wherein the relative angular displacement is carried out automatically, and which offers a high degree of accuracy and excellent reproduceability of the results.

A further object of the invention is to provide a method in which the degree of accuracy in obtaining the coincidence setting can be selected in accordance with the requirements of a particular situation.

A concomitant object of the invention is to provide an arrangement for carrying out the novel method.

These objects, and others which will become evident from a reading of this disclosure, are achieved by the present invention. For example, one aspect of the present invention involves the steps of applying a train of timing pulses to each of the governors so as to cause the associated motors to rotate the elements in synchronism with one another; scanning the elements and generating a trigger signal where the mark of a respective element passes a fixed point; deriving from one of the trains of timing pulses a first train of counting pulses each of which is a measure of the angular displacement of the element associated with the one train of timing pulses per unit time; applying the first train of counting pulses to one input of a forward-reverse counter in automatic response to generation of a trigger signal by the mark of one of the elements, so that the first counting pulses cause the counter to count backwards from a reference value disconnecting the train of first counting pulses from the one input in automatic response to generation of a subsequent trigger signal by the mark of the other element, and also connecting a train of second counting pulses which is stepped down in frequency from the train of first counting pulses, to another input of the counter so that the second counting pulses cause the counter to count forward to the reference value; and employing the train of second counting pulses to modify the pulse frequency of the one train of timing pulses until the counter has returned to the reference value and the signals have reached coincidence to indicate that the marks are angularly coincident.

The invention will hereafter be explained with reference to several exemplary embodiments. However, it is to be understood that these are for explanatory purposes only, and that the scope of protection sought for the invention is defined exclusively in the appended claims.

DESCRIPTION OF THE PREFERRED EMBODIMENTS

The principle of operation of the invention will be described with reference to FIG. 1. In this connection it is to be understood that the novel method and apparatus will be described conjointly throughout.

Figure 1:
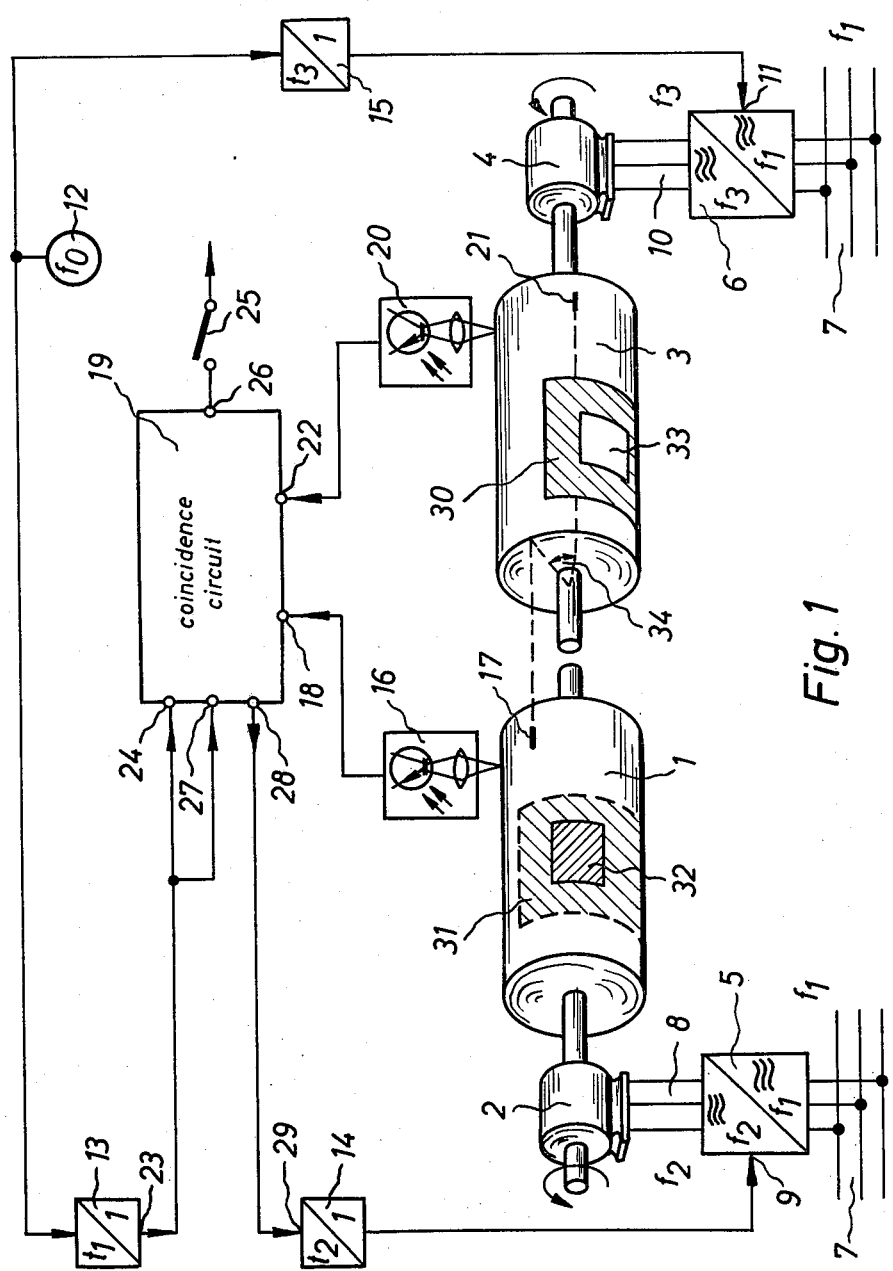
FIG. 1 is a diagrammatic illustration which explains the principle of the present invention.

In FIG. 1 a scanning cylinder 1 is rotated by a synchronous motor 2 in synchronism with a printing form cylinder 3 which is in its turn being rotated by a synchronous motor 4. A power supply net 7, having a frequency $f_1$, supplies power to the motor 2 via a converter 5 and to the motor 4 via a converter 6.

The converters 5, 6 are controlled by pulse trains 9, 11 of timing signals which are derived from a master oscillator 12 in a manner which will be discussed later.

Converter 5 produces from the power supplied by net 7 a voltage 8 having a frequency $f_2$ which depends upon the frequency of the pulse train 9. Similarly, the converter 6 produces from the power of net 7 a voltage having a frequency $f_3$ which depends upon the frequency of the pulse train 11.

Since the rotational speed of synchronous motor 2 is proportional to the frequency $f_2$, and therefore to that of pulse train 9, it follows that this offers a simple way of adjusting the rotational speed of the motor 2 by modifying the frequency of pulse train 9. On the other hand, the rotational speed of the motor 2 is as constant as the pulse train 9, a factor which will later be seen to have importance. It is self-evident that the relationships described for motor 2 and pulse train 9, are similarly applicable with respect to motor 4 and pulse train 11.

As mentioned earlier, the pulse trains 9, 11 are derived from a master oscillator 12 which has the frequency $f_0$. In this connection it should be mentioned that each pulse train 9, 11 could also be derived from a separate oscillator, if desired or indeed by any other type of frequency conversion. To obtain the pulse train 9 in the embodiment of FIG. 1, a frequency reducer 13 having a frequency reduction ratio of $t_1 : 1$, and a further frequency reducer 14 having a frequency reduction ratio of $t_2 : 1$, are connected in circuit between the oscillator 12 and the converter 5. A frequency reducer 15, having a reduction ratio of $t_3 : 1$, is connected in circuit between the oscillator 12 and the converter 6.

A stationary signal generator 16 is associated with the scanning cylinder 1; it scans the periphery of the cylinder 1 and, when it detects a mark 17 provided thereon, generates a signal (hereafter called an "angular position signal") which is supplied to an input 18 of a coincidence circuit 19. A similar stationary signal generator 20 scans the periphery of printing form cylinder 3 for a mark 21 provided thereon; when the generator 20 detects the mark 21, it generates an angular position signal which is supplied to an input 22 of the coincidence circuit 19.

The frequency reducer 13 has an output 23 at which a counting pulse train is tapped off and supplied to a further input 24 of the coincidence circuit 19.

The initial purpose of the coincidence circuit 19 is to determine the relative angular offset that exists between the mark 17 on cylinder 1 and the mark 21 on cylinder 3. This operation is triggered when a contact 25 is closed, either manually or automatically after the rotating cylinders 1, 3 have reached synchronism.

Closing the contact 25 applies a starting signal to an input 26 of the coincidence circuit 19, so that the latter now determines the relative offset by evaluating the angular position signals received from the signal generators 16, 20 and the counting pulse train which is tapped off the frequency reducer 13.

Once the degree of relative offset of the marks 17, 21 on the cylinders 1, 3 has been determined, the cylinder 1 is turned relative to the cylinder 3 until the angular position signals indicative of the positions of the marks 17, 21 coincide with one another, showing that the offset between the marks has been eliminated.

This is done by modifying the rotational speed of the synchronous motor 2, for which purpose the coincidence circuit 19 interferes with the generation of the pulse train 9 for the converter 5. The connection between frequency reducer 13 and frequency reducer 14 is interrupted and at the output 23 of the frequency reducer a pulse train is tapped off which is supplied to an input 27 of the coincidence circuit 19 wherein the pulse train is modified before it is supplied from an output 28 of the coincidence circuit to an input of the frequency reducer 14. The same pulse train derived at output 23 continues to be supplied to input 24 as the earlier-mentioned counting pulse train.

It should be understood that the counting pulse train could be derived from the pulse train 11 of the converter 6, or of a multiple of that pulse train 11. In that case, the coincidence circuit 19 would interfere in and modulate the pulse train 11, and it would be the rotational speed of motor 4 that would be varied.

For ease of explanation of the invention in connection with the problem of adding secondary engraved matter to a previously partly engraved printing form cylinder 3, the latter is shown in FIG. 1 with the previous engraving 30 formed thereon. The original which previously was mounted on the scanning cylinder 1 and controlled the formation of the engraving 30, will no longer be present at the time to which this explanation has been directed. However, for purposes of orientation this original is shown in broken lines on scanning cylinder 1. A secondary original 32 is now mounted on the scanning cylinder; the signals which are generated when it is scanned will control the engraving mechanism (not shown) that makes a secondary engraving on the printing cylinder 3. This secondary engraving must be formed exactly in the area 33 which was previously left free on the printing form cylinder 3 for just this purpose. Since at the time the original engraving 30 was formed, the marks 17 and 21 of the cylinders 1 and 3 were in a position of coincidence, it follows that the exact positioning of the secondary engraving in the area 33 requires that during the formation of the secondary engravings these marks 17 and 21 must again be in a position of coincidence. At the time the cylinders 1 and 3 are started in rotation preparatory to initiation of the secondary engraving operation, their marks 17, 21 are not in coincidence and the secondary engraving therefore could not be properly positioned in the area 33. Even after the cylinders 1, 3 have reached synchronism of rotation, such coincidence does not exist; instead, the marks 17, 21 are angularly offset through a certain angle, e.g. the illustrated angle 34.

It is at this time that the arrangement according to the present invention operates to re-establish the requisite coincidence in preparation for the begin of the secondary engraving operation.

Figure 2:
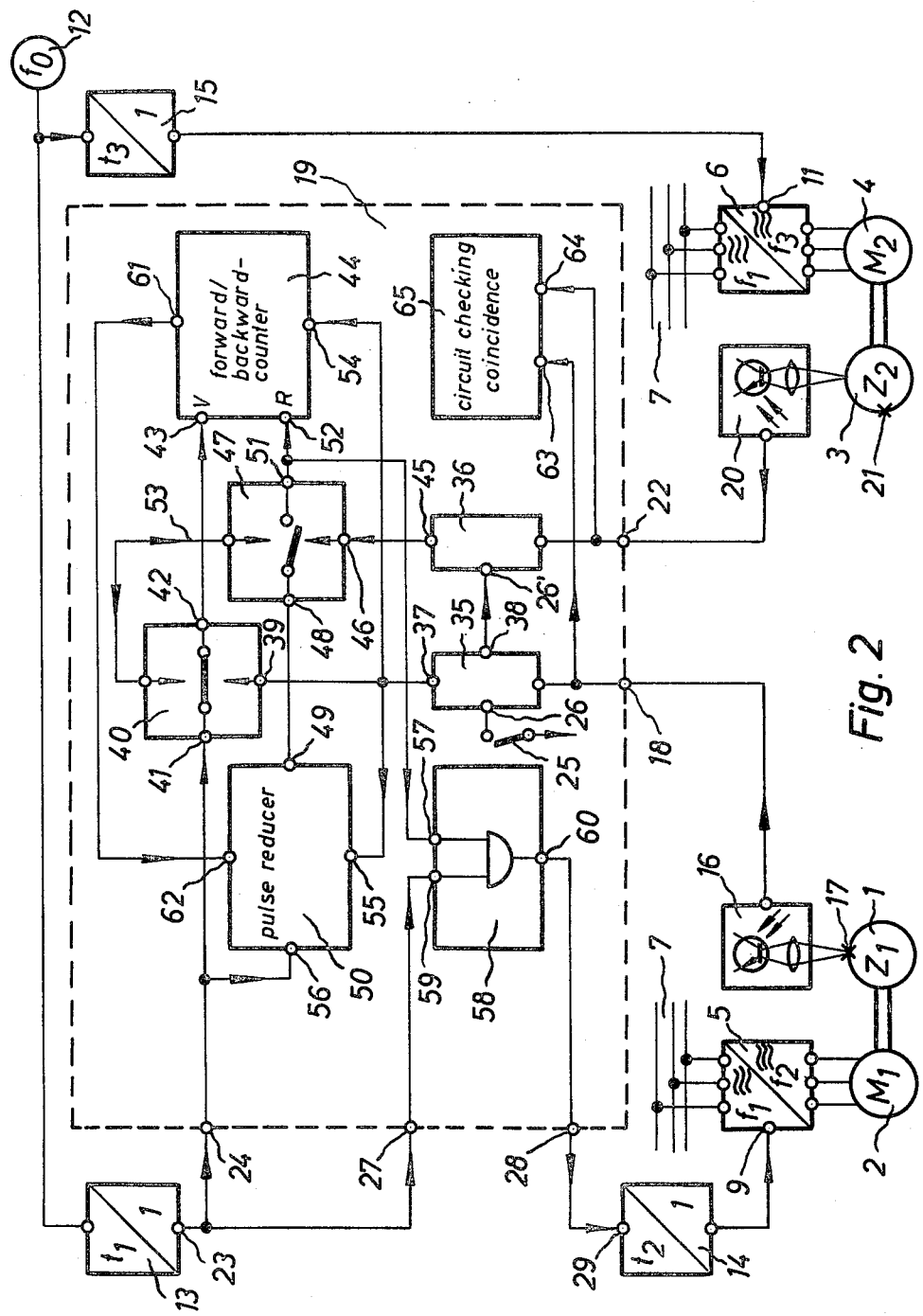
FIG. 2 is a block diagram of an embodiment of a coincidence circuit for use in accordance to the present invention.

FIG. 2 illustrates in form of a block diagram an exemplary embodiment of a coincidence circuit 19 for use in the type of arrangement illustrated in FIG. 1, and serving to modify the frequency of the train of timing pulses for the converter 5 by deleting or suppressing timing pulses from the train.

As pointed out in the description of FIG. 1, the method according to the present invention involves two separate operating stages. In the first stage the relative angular offset of the mark 17 with reference to the mark 21 is determined by evaluating the train of counting pulses and the trigger signals which result from detecting of the mark 17 by the device 16 and of the mark 21 by the device 20.

The number of rotations of the synchronous motor 2 is proportional to the train of timing pulses 9, or to a multiple thereof; this means that it is also proportional to the train of counting pulses derived from the output 23 of the device 13. It follows that one revolution of the synchronous motor 2, and hence one revolution of the cylinder 1 which it drives, corresponds to a certain number of pulses in the train of counting pulses, and that each counting pulse represents a certain angular degree of displacement of the synchronous motor 2. Therefore, if the number of counting pulses in a time interval is measured, the resulting measure is a determinant for the degree of angular displacement which the cylinder 1 has undergone in this time interval. If the time interval is determined by the spacing of the trigger signals, then the number of measured counting pulses represents the relative angular displacement of the cylinders 1 and 3. This degree of relative angular displacement can be measured the more precisely, the higher the frequency level at which the train of counting pulses is tapped off intermediate the master oscillator 2 and the input where the train of timing pulses is supplied to the converter 5. This frequency level can be selected at will.

After the first stage of the method has been completed, the second stage follows in which the cylinder 1 is turned angularly with reference to the cylinder 3. This is accomplished by changing (in the case of the FIG. 2 embodiment, by slowing down) the number of revolutions of the synchronous motor 2 until coincidence between the trigger signals has been obtained.

The reduction in the number of revolutions is accomplished in the coincidence circuit 19 by periodically removing or suppressing pulses in the pulse train which is derived from the output 23 of the frequency reducer 13. As many pulses are suppressed, as correspond to the number of counted pulses of the counting pulse train during the measured time interval.

The exemplary embodiment of the coincidence circuit 19 shown in FIG. 1 illustrates diagrammatically how the timing pulse train 9 for the converter 5 can be obtained, by frequency division in the frequency reducer 13 and the frequency reducer 14, and how the timing pulse train 11 for the converter 6 is obtained by frequency division in the frequency reducer 15, from the frequency $f_o$ of the common control or master oscillator 12. As is known from FIG. 1, the converter 5 supplies energy to the synchronous motor 2 which drives the scanning cylinder 1, whereas the converter 6 supplies the synchronous motor 4 which drives the printing form cylinder 3.

A signal generator 16, described before with respect to FIG. 1, is associated with the scanning cylinder 1 and produces a trigger signal when the mark 17 is scanned.

The signal generator 16 is connected with the input of an impulse suppressing circuit 35. The cylinder 3 in turn is associated with the signal generator 20 which also produces a trigger signal when it scans the mark 21. The signal generator 20 is connected with the input 22 of a further impulse suppressing circuit 36.

Only the first trigger signal generated by the signal generator 16 upon a starting signal which originates when a contact 25 is closed, is permitted to pass through the impulse suppressing circuit 35; all other periodically repeated trigger signals arriving from the signal generator 16 are suppressed. This first trigger signal which passes through the circuit 35 activates the impulse suppressing circuit 36 so that the latter will permit passage therethrough of the first trigger signal which is generated subsequent to activation of the circuit 36 by the signal generator 20; all subsequent trigger signals arriving from the signal generator 20 are suppressed. The output 38 of the circuit 35 is connected with an input 26' of the circuit 36; the output 37 of the circuit 35 is connected with the control input 39 of a switch 40, a further input 41 of which is connected with the input 24 of the coincidence circuit 19 at which the counting pulse train derived from the frequency reducer 13 is applied. The output 42 is connected with the forward-counting input 43 of a forward-reverse counter 44. The output 45 of the circuit 36 is connected with the control input 46 of a further switch 47, whose input 48 is connected to the output 49 of a pulse reducer 50, and whose output 51 is connected to the reverse counting input 52 of the forward-reverse counter 44. Both of the switches 40 and 47 are operatively connected via a conductor 53.

The trigger signal which is permitted to pass through the circuit 35 from the signal generator 16 reverses the counter 44 via a reversing input 54 and also the pulse reducer 50 via an input 55. In addition, this trigger signal is applied to the control input 39 of the switch 40 and also via the conductor 53 to the switch 47. This results in the switch 40 being closed and the switch 47 being opened, so that the counting pulse train derived from the frequency reducer 13 is now supplied to the forward counting input 43 and the counting operation in the counter 44 begins.

Subsequent to the beginning of the counting operation the circuit 36 will pass the first trigger signal derived from the signal generator 20. This trigger signal acts upon the control input 46 of the switch 47, closing the switch 47 again and opening the switch 40. The counting which has taken place until now in the counter 44 is now interrupted and a reverse counting operation is initiated, in that the output 49 of the pulse reducer 50 is now connected to the reverse counting input 52 of the counter 44. In the pulse reducer 50 the counting pulse train which is applied at the input 24 of the coincidence circuit 19 and at the input 56 of the pulse reducer 50, is reduced in accordance with a preselected ratio so that a new pulse train is formed which is supplied via the output 49 and the switch 47 to the reverse counting input 52 of the counter 44.

The switch is also connected via output 51 with an input 57 of an AND-gate of the impulse suppressing circuit 58, a second input 59 of which is connected via the input 27 of the coincidence circuit 19 with the output 23 of the frequency reducer 13. The AND-gate has an output 60 which is connected via the output 28 of the coincidence circuit 19 with the input 29 of the frequency reducer 14.

The pulse train leaving the pulse reducer 50 has two functions: it causes the counter 44 to count backward to a reference value, for example zero, and it continues to delete or suppress pulses from the pulse train applied at the input 59 of the circuit 58 until the counter 44 has returned to the reference value, for example zero. When the counter 44 reaches zero, that is when it has been counted back from the setting to which the counting pulse train has previously moved it, a zero signal appears at the output 61 of the counter 44 and is supplied to an input 62 of the pulse reducer 50, to terminate the operation of the latter and also terminate the pulse suppression.

The arrangement according to FIG. 2 also has a coincidence monitoring circuit 65 to which the trigger signals of the signal generator 16 are supplied via an input 63, while the trigger signals of the signal generator 20 are supplied to an input 64 of the circuit 65. The purpose of the circuit 65 is to continuously check for coincidence of the trigger signals and to indicate when coincidence has in fact been reached. This secondary, i.e. additional, supervision of whether or not coincidence has been reached, has a certain advantage. The relative angular displacement of the marks on the cylinders 1, 3 is measured in the device according to the present invention, but the relative angular turning of the cylinders 1, 3 is effected via the aforementioned steps of changing the rotary speed of one of the synchronous motors. If, as in the illustrated example, the cylinders and their associated synchronous motors are directly coupled, this presents no disadvantages. In practical use, however, it is frequently the custom to interpose a gear train between the synchronous motor and the cylinder driven thereby, and the cylinder is then connected with the gear train via a coupling. Since the gear train and the coupling may have a certain amount of play, this may lead to errors in the automatic coincidence setting. Under these circumstances, the continuous monitoring of whether or not coincidence is actually obtained, that is the monitoring by means of the circuit 65, offers an additional safety feature.

Figure 3:
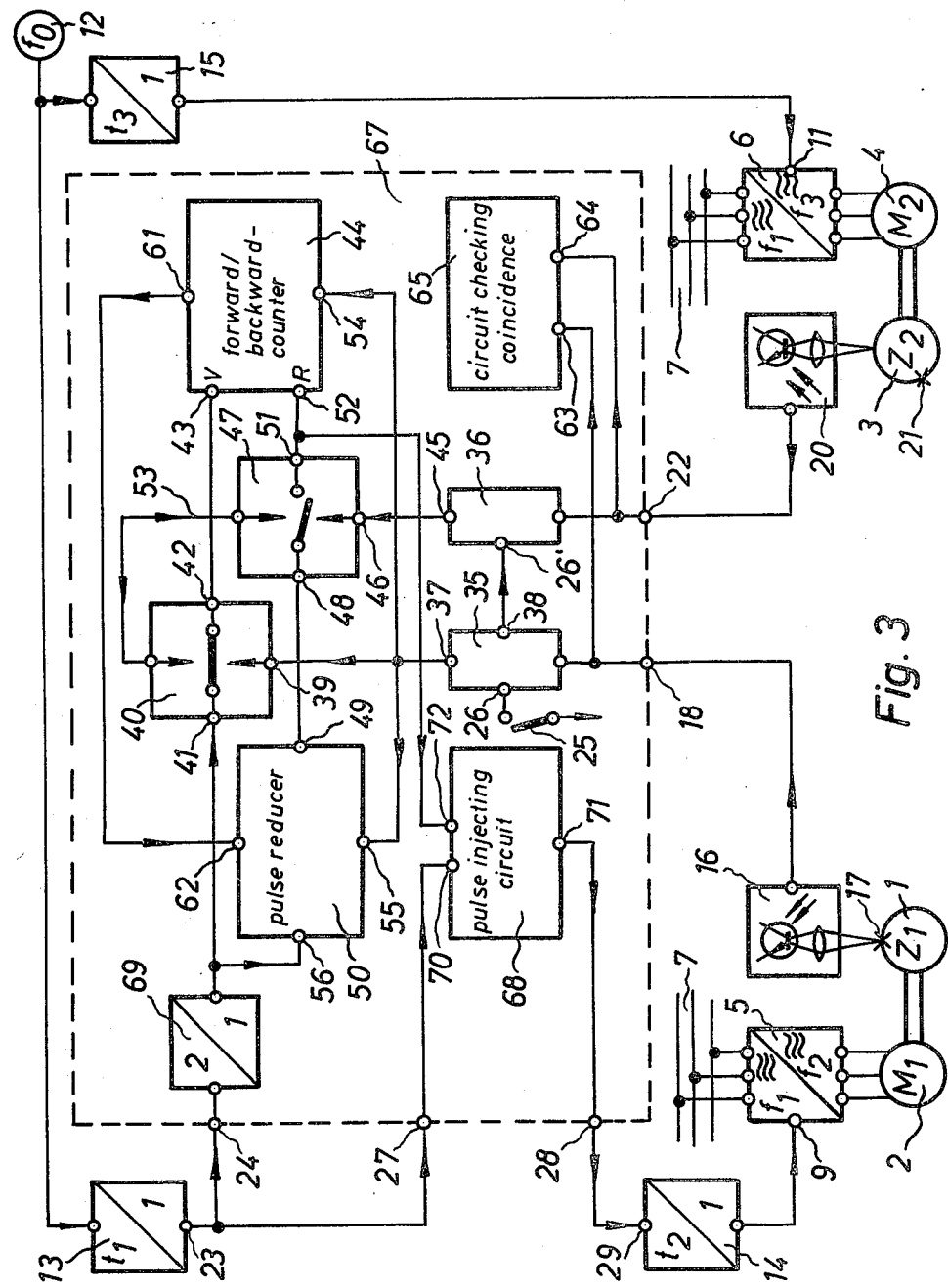
FIG. 3 is a view similar to FIG. 2, but illustrating a different embodiment.

Coming now to FIG. 3 it will be seen that in this Figure there is illustrated a further embodiment of an exemplary coincidence circuit 67, by way of a block diagram. In this circuit the modification of the train of timing pulses 9 for the converter 5 is obtained by adding timing pulses, rather than deleting them as in the embodiment of FIG. 2. The construction and operation of the coincidence circuit 67 are largely identical with those of the circuit 19 described in FIG. 2.

Under these circumstances, it is merely necessary to describe the differences between the circuit in FIG. 3 and the circuit in FIG. 2. In the coincidence circuit 67 of FIG. 3 the impulse suppressing circuit 58 of FIG. 2 is replaced by an impulse injecting circuit 68. In addition, the coincidence circuit 67 has a frequency reducer 69 that is not present in FIG. 2.

The pulse train which is applied to the input 27 of the coincidence circuit 67 travels to the input 70 of the pulse injecting circuit 68 in which the pulse train is stepped down at a rate of 2 : 1; the stepped-down pulse train is then used to obtain a further pulse train which is displaced by half a period to the stepped-down pulse train. The latter is supplied via the output 71 of the circuit 68 and the input 28 of the coincidence circuit 67 to an input 29 of the frequency reducer 14. The pulse train output of the pulse reducer 50 is supplied to the input 72 of the circuit 68 where it controls the injection of pulses from the phase-shifted pulse train (which is offset to half a period with respect to the stepped-down pulse train) into the stepped-down pulse train. This injection of pulses increases the rate of timing pulses in the pulse train 9 for the converter 5 and thereby increases the rotary speed of the synchronous motor 2, thus causing a relative angular displacement of the cylinder 1 with reference to the cylinder 3.

In the embodiment of FIG. 2 the pulse trains applied to the input 27 and the output 28 have one and the same frequency as long as no pulses are suppressed by the circuit 58. In contradistinction to this, the pulse train applied at the output 28 of the coincidence circuit 67 of FIG. 3 has only half the frequency of the pulse train which is applied to the input 27 as long as no pulses are injected by the circuit 68. To provide an accommodation for the changed circumstances, the counting pulse train must be stepped down in the stepped down circuit 69 at the ratio of 2 : 1 in the coincidence circuit 67.

For a better understanding of the invention, the various functional components of the coincidence circuit 19 will now be described by way of example.

Figure 4:
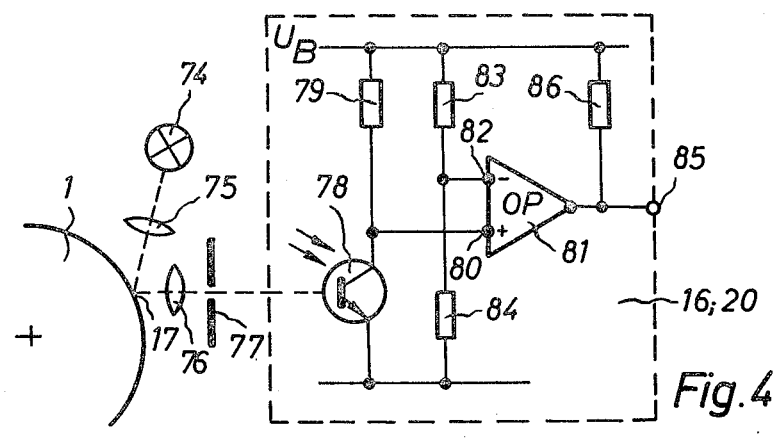
FIG. 4 is a diagram showing an embodiment of a signal generator for use in accordance with the present invention.

FIG. 4 shows an exemplary embodiment of the signal generator 16, it being understood that the construction of the signal generator 20 is identical thereto. In this embodiment, the filament of a lamp 74 is reproduced via an optical system 75 on the surface of the cylinder 1. When the light is reflected by the mark 17 it travels through a further optical system 76 and a mask 77 to impinge upon a photo-transistor 78 whose emitter is connected to mass and whose collector is connected via a resistor 79 with the supply voltage $U_B$. In addition, the collector is connected with the non-inverting input 80 of an operational amplifier 81 which also has an inverting input 82 that is connected via a resistor 83 to the supply voltage $U_B$ and via a resistor 84 to mass. The output 85 of the operational amplifier 81 is connected with the supply voltage $U_B$ via a working resistor 86. The operational amplifier 81 in this embodiment acts as a comparator the comparison voltage of which that is applied at the inverting input 82 is determined by the voltage divider formed by the resistances 83 and 84. When light reflected from the mark 17 impinges the photo-transistor 78 the latter briefly drops to a low ohm condition, and a signal is generated at the output 85 of the operational amplifier 81.

The signal generator 16 is connected to the input 18 of the coincidence circuit 19 via its output 85. It should be understood that in place of the signal generator that has been described by way of example, it is also possible to use a mechanical, an electrical or a magnetic signal generator of a different type.

Figure 5:
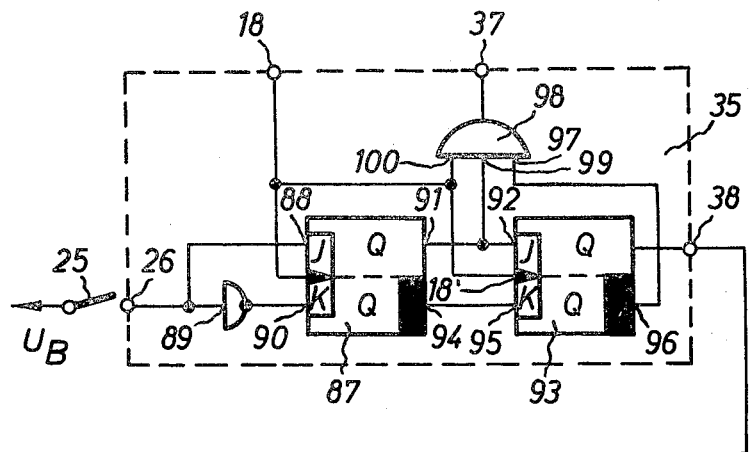
FIG. 5 is a diagram illustrating an embodiment of a signal-suppressing circuit.

An exemplary embodiment for the impulse suppressing circuits 35, 36 is shown in FIG. 5. The circuit 35 permits only the first trigger signal of the signal generator 16 to pass, that is that trigger signal which is the first one after closing of the contact 25; all other periodically recurring trigger signals, that is all trigger signals which recur once during each revolution of the cylinder 1, are suppressed. The signal which travels through the circuit 35 rather than being suppressed therein, activates the circuit 36 so that the latter also permits the first signal derived subsequent to activation from the signal generator 20 to pass, whereas all following trigger signals derived from the signal generator 20 are suppressed.

The input 18 of the circuit 35, to which the trigger signals generated by the signal generator 16 are supplied, is the input of a JK-master-slave flipflop 87. The input 26 of the circuit 35, which is controlled by the contact 25, is connected with the J-input 88 and via an inverter 89 it is connected with the K-input 90 of the JK-flipflop 87. The Q-output 91 of the JK-flipflop 87 is connected to the J-input 92 of a further JK-flipflop 93, and the $\overline{Q}$-output 94 of the JK-flipflop 87 is connected with the K-input 95 of the JK-flipflop 93. The pulse inputs of the JK-flipflop 93 and JK-flipflop 87 are connected with one another. The $\overline{Q}$-output 96 of the JK-flipflop 93 is connected with an input 97 of an AND-gate 98, a second input 99 of which is connected Q-output 91 of the JK-flipflop 87, and a third input of which is identified with reference numeral 100 and is connected to the input 18 of the circuit 35. The Q-output of the JK-flipflop 93 is identical with the output 38 of the circuit 35.

After resetting of the JK-flipflop the $\overline{Q}$-output 94 and the $\overline{Q}$-output 96 are at H signal. After closing of the contact 25 H signal is supplied to the J-input 88 and L signal is supplied to the K-input 90, so that the JK-flipflop 87 is now operational. The signal derived from the signal generator 16 and appearing after closing of the contact 25 at the input 18 of the JK-flipflop 87, sets the flipflop 87 while the trigger signal at the input 18' of the JK-flipflop 93 is ineffective because prior to inversion of the JK-flipflop 87 the J-input was at the L signal applied to it and the K-input 95 had the H signal applied to it.

After inversion of the JK-flipflop 87 and AND condition for the gate 98 is met, and the J-input 92 has H signal applied to it whereas the K-input 95 has L signal applied to it, so that the JK-flipflop 93 is now in readiness. This means that the next trigger signal can pass the AND-gate 98 and that its negative flank inverts the JK-flipflop 93, so that the AND-gate 98 is blocked for any further trigger signals that reach the input 100.

The impulse suppressing circuit 36 corresponds in its construction and operation to the circuit 35. The only difference is that the preparation of the JK-flipflop 87' for operational readiness takes place not via a contact, but instead is controlled from the output 38 of the circuit 35 via the input 26' of the circuit 36.

Figure 6:
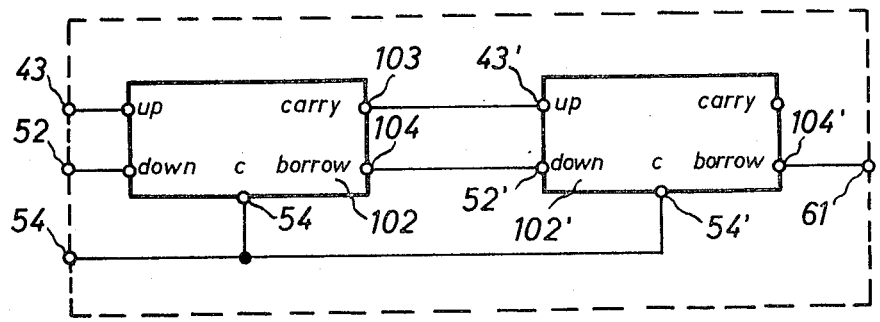
FIG. 6 is a diagram illustrating an embodiment of a forward-reverse counter for use in accordance with the invention.

An exemplary embodiment of the forward-reverse counter 44 is illustrated in FIG. 6. To increase its counting capacity the counter 44 is constructed of a plurality of integrated counter units 102, 102', but for purposes of the explanation only two of these have been illustrated in FIG. 6.

A counter unit 102 is a synchronous binary forward-reverse counter of the type SN 74 193 that is commercially available from the Texas Instruments Corporation and has a counting capacity of 4 bits (as per TTL-Codebook of Texas Instruments Inc. page 148 ff.). It has a forward counting input 43, a reverse counting input 52 and an output 103 for cascading of the forward pulses, an input 104 for cascading of the reverse pulses, and a zero setting input 54. Counter units of the aforementioned type Sn 73 193 are commercially available and require no further description.

To form a cascade the output 103 of the counter unit 102 is connected with the forward counting input 43' of the counting unit 102', and the output 104 of the counter unit 102 is connected with the reverse counting input 52' of the counter unit 102'. The zero setting inputs 54 and 54' are connected with one another. The counting pulse train is supplied to the forward counting input 52 of the unit 102, and the output pulse train of the circuit 50 is supplied to the reverse counting input 52. When this is done, L signal appears at the output 104' of the unit 102' when the counter 44 has reached zero position.

Figure 7:
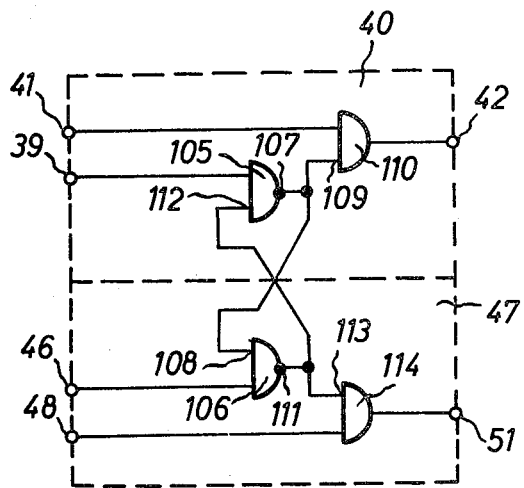
FIG. 7 is a switch diagram of an embodiment of the invention.

FIG. 7 shows an exemplary embodiment of the switches 40 and 47 which are operatively connected with one another. Switch 40 will be seen to have an input 39 which constitutes the input of a NAND-gate 105; the input 46 of the switch 47 constitutes the input of a further NAND-gate 106. The output 107 of the NAND-gate 105 is connected with the input 108 of the NAND-gate 106 and also with the input 109 of an AND-gate 110, whose output is identical with the output 42 of the switch 40. The input 41 of the switch 40, at which the counting pulse train is applied, constitutes the second input of the AND-gate 110.

The output 111 of the NAND-gate 106 is coupled with the input 112 of the NAND-gate 105 and connected with the input 113 of a further AND-gate 114 whose output is identical with the output 51 of the switch 47. The input 48 of the switch 47, at which the output pulse train of the circuit 50 is supplied, constitutes the second input of the AND-gate 114. When L-signal is present at the input 39 and H-signal is present at the input 46, the counting pulse train is switched from input 41 via the AND-gate 110 to the output 42. However, if H-signal is applied at the input 89 and L signal is applied at the output 46, the output pulse train of the circuit 50 is supplied from the input 48 via the AND-gate 114 to the output 51.

Figure 8B:
FIG. 8b is a pulse-train diagram illustrating the control-pulse frequency reducing aspect of the invention.
Figure 8B:
Figure 8A:
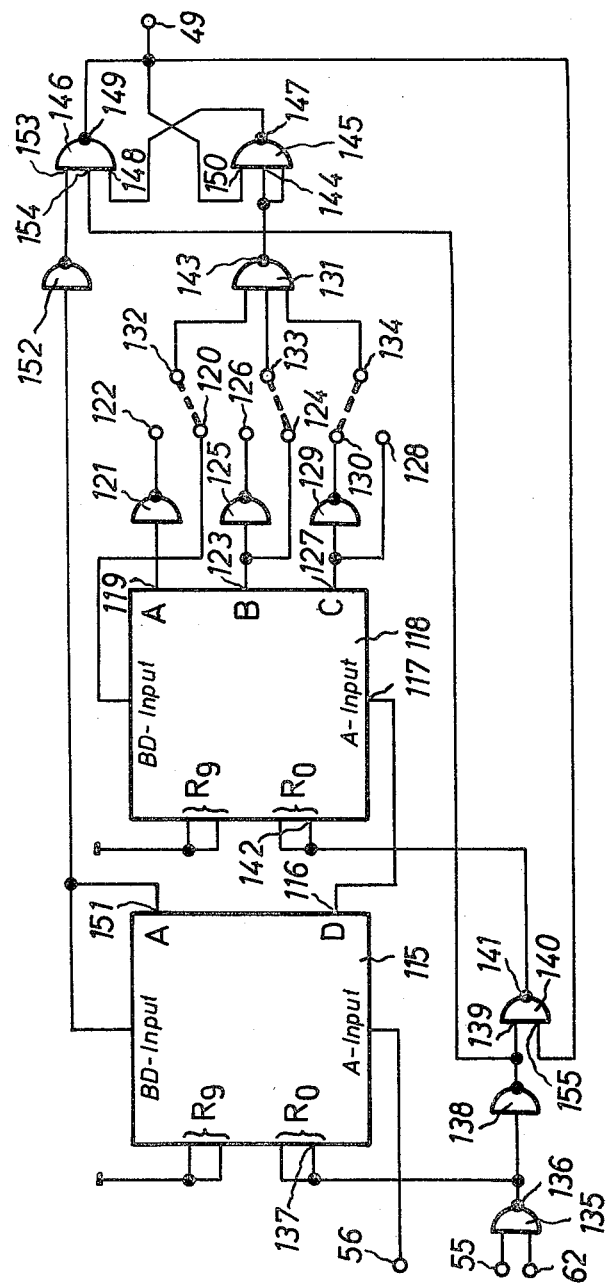
FIG. 8a is a diagram showing a pulse-frequency step-down circuit according to the invention.

Coming to FIG. 8a it will be seen that this Figure illustrates an exemplary embodiment of the circuit 50 having a selectable selector ratio of 10 : 1 to 70 : 1. In this embodiment the input 56 of the circuit 50 has the counting pulse train applied to it; it is the input of a decimal counter 115 whose D-output 116 is connected with the input 117 of a further decimal counter 118. The decimal counters 115, 118 are of the type SN 7490 N which is commercially available from Texas Instruments and which contains four JK-flipflops which operate according to the 8-4-2-1 code (see TTL-Codebook of Texas Instruments Corporation page 123 ff.). Since these units are commercially available and known to those skilled in the art, and have been identified above so that further information may be obtained concerning them, a more detailed description herein is not necessary.

The decimal counter 115 operates as a decadic stepdown; however, the stepdown ratio of the second decimal counter 118 is adjustable. For this purpose the outputs of the individual JK-flipflops of the decimal counter 118 are connected to a coding circuit in known manner, in which a signal for zero setting of the decimal counter 118 is obtained after a desired number of pulses has been counted. The A-output 119 of the decimal counter 118 is connected with a terminal 120 and via an inverter 121 with a terminal 122. The B-output 123 of the decimal counter 118 is connected to a terminal 124 and via an inverter 125 to another terminal 126. Finally, the C-output 127 of the counter 118 is connected with a terminal 128 and via a further inverter 129 with a terminal 130.

To select the stepdown ratio, three of the terminals are connected with three inputs of a NAND-gate 131. In the exemplary embodiment a ratio of 30 : 1 is selected. Since the decimal counter 115 steps down at a ratio of 10 : 1, the step down ratio for the decimal counter 118 must be selected to be 3 : 1. This means that the terminal 102 is to be connected with an input 132, the terminal 124 with an input 133 and the terminal 130 with an input 134 of the NAND-gate 131.

To reset the circuit 50 the input 55 is connected with the input of a NAND-gate 135 whose output 136 is connected to the zero setting input 137 of the decimal counter 115 and via an inverter 138 to the input 139 of a further NAND-gate 140. The output 141 of the NAND-gate 140 is connected with the zero setting input 142 of the decimal counter 118. Resetting prior to beginning of the step-down operation is effected via a pulse applied at the input 35 of the circuit 50. The stepdown operation can be interrupted via the input 62.

In order to obtain a certain sequence for the output pulse train of the circuit 50, the output 143 of the NAND-gate 131 is connected with an input 144 of a further NAND-gate 145 which is connected with a third NAND-gate 146 to form an RS-flipflop. The output 147 of the NAND-gate 145 is connected with an input 148 of the NAND-gate 146 and the input 149 of the NAND-gate 146 is connected with a further input 150 of the NAND-gate 145. In addition, a connection exists from A-output 151 of the decimal counter 115 via an inverter 152 to the input 153 of the NAND-gate 146, a further connection is established between the input 139 of the NAND-gate 140 and the third input 154 of the NAND-gate 146, and still another connection exists between the output 149 of the NAND-gate 146 and an input 155 of the NAND-gate 140.

Circuit 50 operates as follows:

After every tenth pulse recorded in the decimal counter 115 and derived from the counting pulse train that is applied to the input 56 of the circuit 50, the decimal counter 115 supplies a signal via the output 116 to the input 117 of the decimal counter 118; this signal is then counted in the decimal counter 118. After thirty pulses have been counted in the counter 115 and three have been counted in the counter 118, H signal appears at all inputs 132, 133 and 134 of the NAND-gate 131, and L signal appears at its output 142. For this purpose the reset and set flipflop (RS-flipflop) formed by the NAND-gate 145 and the NAND-gate 146 is inverted and at its output 149 L signal appears which effects the zero setting of the decimal counter 118 via the NAND-gate 140 and the input 142.

After the thirtyfirst pulse has been counted in the counter 115 an H signal appears at the A-output 151, and an L signal appears at the input 153 of the NAND-gate 146, causing the RS-flipflop to invert and L signal to reappear at the output 149.

In FIG. 8b the operation of the circuit 50 and the manner in which impulses are suppressed by the output pulse train of the circuit 50 in a AND-gate 58, is explained by way of a pulse diagram.

In part A of FIG. 8b the counting pulse train is illustrated, whereas in part B the output pulse train of the RS-flipflop is shown that is formed by the NAND-gates 145 and 146.

Part C of FIG. 8b shows the signal which is obtained at the output 60 of the AND-gate 58 by pulse suppression; at the input 59 of the AND-gate 58 the counting pulse train is applied and at the input 58 the output pulse train of the circuit 50 is applied, whose stepdown ratio is set for 30 : 1.

Figure 9:
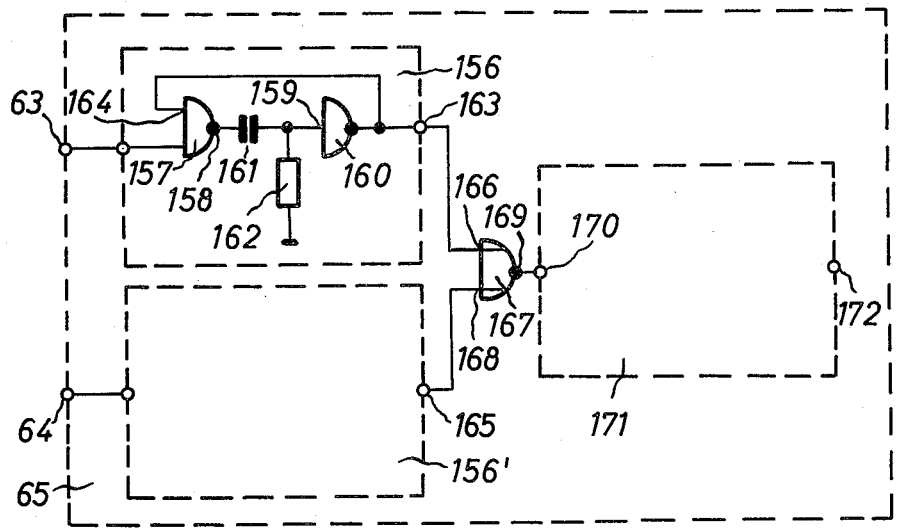
FIG. 9 is a diagram of an embodiment of a coincidence-monitoring control circuit.

An exemplary embodiment of a coincidence monitoring circuit 65 is illustrated in FIG. 9. The trigger signal derived from the signal generator 16 is supplied via the input 63 of the circuit 65 to the input of a monostable multivibrator 156 which is identical with the input of a NAND-gate 157. A capacitor 161 is connected between the output 158 of the NAND-gate 157 and the input 159 of an inverter 160. The input 159 is connected to ground via a resistor 162. The output 163 of the inverter 160 is connected to the other input 164 of the NAND-gate 157 and at the same time constitutes the output for the monostable multivibrator 156.

In the rest position H signal is present at the input 63 of the monostable multivibrator 15. When the capacitor 161 is not charged, the input 159 of the inverter 160 is in the L range and the input 164 of the NAND-gate 157 is in the H range. The output 158 of the NAND-gate 157 then carries the L signal. If the signal at the input 63 of the monostable multivibrator 157 shifts from H to L signal, the output 158 of the NAND-gate 157 and the input 159 of the inverter 160 shifts to H signal. The output 163 of the monostable multivibrator 156 then assumes L signal.

After the potential jump the input 63 of the monostable multivibrator 156 the capacitor 161 is charged via the resistor 162 until the input 159 again has L signal. At this time H signal appears at the output 163 of the monostable multivibrator 156. The dwelltime of the output 163 at L signal is determined by the time constant of the RC-element, which is composed of the capacitor 161 and the resistor 162.

The trigger signal of the signal generator 20 is supplied via the input 64 of the circuit 65 to the input of another monostable multivibrator 156' having an output 165. The multivibrators 156 and 156', which are both of identical construction, convert the needle-shaped trigger signals into impulses of defined width. The broadening in the width of the impulses produces a tolerance range whose width is double that of the impulses for the indication of coincidence.

The output 163 of the monostable multivibrator 156 is connected with the input 166 of a NOR-gate 167 and the output 165 of the monstable multivibrator 156' is connected with the input 164 of the NOR-gate 167 whose output 169 is connected to the input 170 of a further monostable multivibrator 171. The output pulses of the monostable multivibrators 156, 156' are checked for simultaneous occurrence in the NOR-gate 167. If these pulses are in fact simultaneously generated, that is if they coincide, then an impulse appears at the output 169 of the NOR-gate 167 which is prolonged in the monostable multivibrator 171 and is available at the output 172 thereof for supply to a signal generator such as a non-illustrated lamp, which indicates that the coincidence has been reached..

Figure 10A:
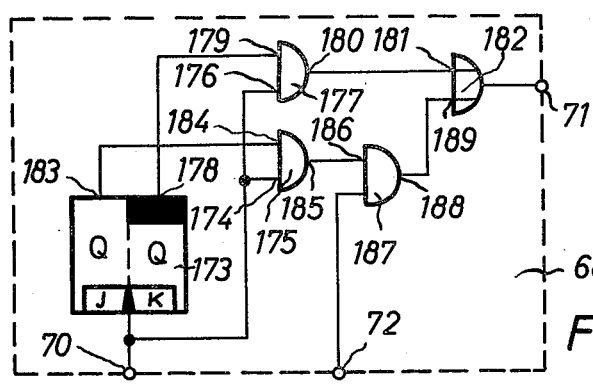
FIG. 10a is a diagram of a control-pulse frequency increasing circuit.

FIG. 10a shows an exemplary embodiment of a circuit 68 for injecting pulses (in accordance with the embodiment of FIG. 3). The input 70 of the circuit 68 at which the pulse train is applied into which pulses are to be injected, is the pulse input of a JK-flipflop 173. The input 70 is also connected to an input 174 of an AND-gate 175 and to an input 176 of a further AND-gate 177. The Q-output 178 of the JK-flipflop 173 is connected with the other input 179 of the AND-gate 177, whose output 180 is connected to one input 181 of an OR-gate 182 whose output constitutes the output 71 of the circuit 68. This output 71 delivers the pulse train into which pulses have been injected.

The Q-output 183 of the JK-flipflop 173 is connected with the other input 184 of the AND-gate 175, whose output 185 is connected to one input 186 of a further AND-gate 187. The other input 72 of the AND-gate 187 constitutes the control input of the circuit 68, at which the output pulse train of the circuit 50 is applied.

The output 188 of the AND-gate 187 is connected with the other input 189 of the OR-gate 182. The pulse train 70 which is applied to the input 70 inverts the JK-flipflop 173, and therefore a pulse train appears at the output 180 of the AND-gate 177 which is stepped down with respect to the pulse train applied to the input 70 in a ratio of 2 : 1. This stepped down pulse train also appears, but offset by half a period, at the output 185 of the AND-gate 175.

When L-signal appears at the input 72 of circuit 68, only the stepped-down pulse train can travel from output 180 via OR-gate 182 to the output 71 of the circuit 68. If, however, H-signal is present at the input, then an additional pulse train travels from output 185 of AND-gate 175 via AND-gate 187 and OR-gate 182 to the output 71, namely the pulse train which is not only stepped down but is also shifted through half a period.

Figure 10B:
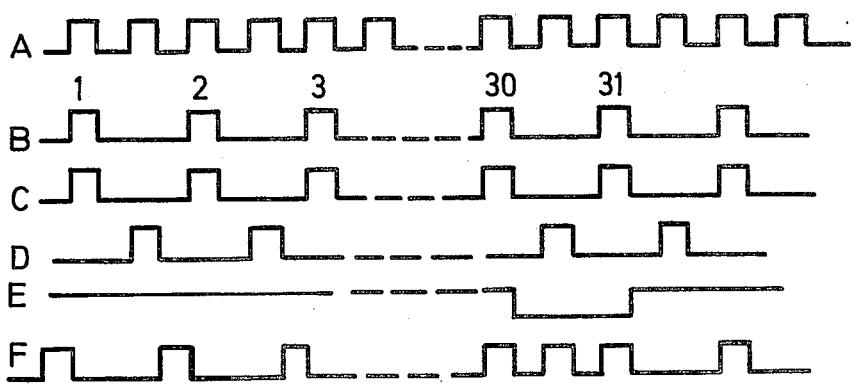
FIG. 10b is a pulse-train diagram illustrating the control-pulse frequency increasing aspect of the invention.

Details of the operation of the circuit in FIG. 10a will be apparent from the pulse diagram in FIG. 10b, which explains the pulse injection into a pulse train that is controlled by the output pulse train derived from circuit 50 (see FIGS. 3 and 8a).

In FIG. 10b the diagram A illustrates the pulse train at the input 70 of the circuit 68, whereas B shows the counting pulse train that is stepped-down at a ratio of 2 : 1. Diagram C shows the stepped-down pulse train at the output 180 of the AND-gate 177 and Diagram D shows the pulse train that is stepped down and shifted through half a period, as it appears at the output 185 of the AND-gate 175.

Diagram E of FIG. 10b shows the output pulse train of the circuit 50 at a selected step-down ratio of 30 : 1, as it is applied to the input 72 of the circuit 68, whereas diagram F illustrates the output signal at the output 71 of the circuit 68.

It should be understood that while specific details of certain exemplary embodiments have been described and illustrated herein, it is not intended that the invention be limited thereto. The invention for which protection by Letters Patent is sought, is intended to be embraced in its broad aspects by the appended claims.

We claim:

1. A method of effecting relative angular displacement between two rotary elements each of which is driven by an associated converter controlled synchronous motor, until respective marks on the peripheries of said elements are substantially angularly coincident, the steps comprising:

applying respective signal trains of timing pulse signals to said converters to cause each of said synchronous motors to rotate its associated element in synchronism with the respective signal trains, whereby the frequency of the respective signal trains of timing pulse signals defines the angular velocity of the associated element;

scanning said respective marks and generating a trigger signal when the mark of a respective element rotates passed a predetermined fixed point;

deriving from one of said signal trains a first counting train of counting pulse signals each of which defines an angular increment of the associated element;

applying said first counting train to an up/down counter in response to the generation of a trigger signal, whereby said first counting train causes said counter to count in one direction from a reference value;

disconnecting said first counting train from said counter in response to the generation of a subsequent trigger signal, whereby the count of said counter is a measure of the relative angular displacement between said elements;

generating a second counting train of counting pulse signals having a frequency lower than the frequency of said first counting train;

connecting said second counting train to said counter to cause said counter to count in another direction to said reference value; and using said second counting train to add timing pulse signals to said one signal train to increase the angular velocity of its associated element until said counter has returned to said reference value and said trigger signals have reached coincidence to indicate that said marks are angularly coincident.

2. The method as claimed in claim 1, further comprising the step of continuously analyzing said trigger signals and indicating when coincidence has been reached between them.

3. The method as claimed in claim 1, further comprising the step of preselecting the frequency ratio between said first and second counting trains prior to connecting said second counting train to said counter.

4. The method as claimed in claim 1, further comprising the step of increasing the frequency ratio between said first and second counting trains while said counter is counting to said reference value as a function of the instantaneous setting of said counter.

5. An arrangement for effecting relative angular displacement between two rotary elements each of which is driven by a converter-controlled synchronous motor, until respective marks on the peripheries of said elements are substantially angularly coincident, comprising in combination:

first means operable for applying a train of timing pulse signals to each of the converters to cause the associated synchronous motors to rotate said elements in synchronism with the respective signal trains of timing pulse signals, whereby the frequency of each train of timing pulse signals determines the rotational rate of the associated element;

second means operable for scanning said respective marks and generating a trigger signal when the mark of one element rotates passed a predetermined fixed point;

third means operable for deriving from one of said trains of timing pulse signals a first train of counting pulse signals each of which defines an angular increment of the associated element;

an up/down counter;

fourth means operable for applying said first train of counting pulse signals to said counter in response to the generation of a trigger signal, said counter counting in a given direction from a reference value for said first train;

fifth means operable for disconnecting said first train of counting pulse signals from said counter in response to the generation of a subsequent trigger signal;

sixth means operable for deriving a second train of counting pulse signals which is stepped down in frequency from said first train of counting pulse signals, and applying it to said counter so that said counter counts in another direction to said reference value; and seventh means operable for using said second train of counting pulse signals to add timing pulse signals to said one train of timing pulse signals to increase the angular velocity of its associated element until said counter has returned to said reference value and said trigger signals have reached coincidence to indicate that said marks are angularly coincident.

6. The arrangement as claimed in claim 5, comprising a pair of connected signal suppressing circuits each connected with said scanning means, one of said circuits being activated by a starting impulse to permit passage of one trigger signal from one of said element and thereafter block all other trigger signals from said one element, the other of said circuits being activated by the passed trigger signal and permitting passage of the first trigger signal which arrives thereafter from the other element while blocking all subsequent trigger signals.

7. The arrangement as claimed in claim 6, comprising a master oscillator and a frequency generator to generate said train of timing pulse signals; a frequency step-down circuit connected to said frequency generator to generate said second train of counting pulse signals; and a pulse adding circuit arranged between said frequency generator and said converter for one of the synchronous motors to modify the frequency of said one train of timing pulse signals and therewith the angular velocity of said one synchronous motor; said pulse adding circuit being operably connected to said frequency step-down circuit for controlling the adding of pulses by said second train of counting pulse signals.

8. The arrangement as claimed in claim 7, wherein said counter has a forward-counting-input means connected with an input means of said frequency step-down circuit through a switch activate by said passed first trigger signal, a reverse-counting-input means connected to an output means of said frequency step-down circuit through another switch activate by said subsequent trigger signal and to the control-input means of said pulse adding circuit, and an output means connected with a deactivating input means of said frequency step-down circuit.

9. The arrangement as claimed in claim 8, one of said signal suppressing circuits having an output means connected with a resetting input means of said frequency step-down circuit and with a resetting input means of said counter and being operatively connected with a pair of switches so that a trigger signal passed by said one signal suppressing circuit closes one of said switches and initiates forward counting in said counter and opens the other of said switches to terminate reverse counting in said counter; the other of said signal suppressing circuits having an output means operatively connected with said switches so that a trigger signal passed by said other signal suppressing circuit closes said other switch to initiate reverse counting of said counter and starts pulse adding by said pulse adding circuit, said trigger signal passed by said other signal suppression circuit also opening said one switch to terminate forward counting in said counter.

* * * * *